US011464223B1

(12) United States Patent
Stouffer

(10) Patent No.: US 11,464,223 B1
(45) Date of Patent: Oct. 11, 2022

(54) SIDING OUTER CORNER POST CAP

(71) Applicant: Stouffer Technologies, Inc., Granger, IN (US)

(72) Inventor: John D. Stouffer, Granger, IN (US)

( * ) Notice: Subject to any disclaimer, the term of this patent is extended or adjusted under 35 U.S.C. 154(b) by 0 days.

(21) Appl. No.: 17/377,559

(22) Filed: Jul. 16, 2021

(51) Int. Cl.
*A01M 29/30* (2011.01)
*E04F 13/073* (2006.01)

(52) U.S. Cl.
CPC ......... *A01M 29/30* (2013.01); *E04F 13/0733* (2013.01)

(58) Field of Classification Search
CPC ... A01M 29/30; E04F 13/0733; E04F 11/163; E04F 19/028; E04F 2013/063; E04F 11/166; E04F 13/0801; E04F 19/0463; E04F 19/0468; E04C 3/30; E04C 3/125; E04H 17/006
USPC ........ 52/58, 60, 101, 287.1, 288.1, 300, 301
See application file for complete search history.

(56) References Cited

U.S. PATENT DOCUMENTS

| 3,742,668 A | * | 7/1973 | Oliver | E04F 19/028 52/468 |
| 4,998,947 A | * | 3/1991 | Dostall | E04F 19/024 52/287.1 |
| 4,999,961 A | * | 3/1991 | McNary | E04F 19/024 52/287.1 |
| 5,542,222 A | * | 8/1996 | Wilson | E04F 19/06 52/287.1 |
| 5,979,129 A | * | 11/1999 | Azar | E04F 21/0015 52/211 |
| D431,772 S | * | 10/2000 | Tsui | D8/403 |
| 8,661,751 B1 | * | 3/2014 | Lawrie | E04F 19/064 52/287.1 |
| D753,848 S | * | 4/2016 | Gori | D25/119 |
| 10,221,572 B2 | * | 3/2019 | Houser | E04F 13/0733 |
| 2006/0277853 A1 | * | 12/2006 | Dillon | E04F 19/028 52/287.1 |
| 2015/0000219 A1 | * | 1/2015 | Yarmo | E04F 13/0733 52/287.1 |
| 2015/0204078 A1 | * | 7/2015 | Wade | E04F 13/18 52/287.1 |
| 2018/0135308 A1 | * | 5/2018 | Houser | E04F 13/0733 |

* cited by examiner

*Primary Examiner* — Brian E Glessner
*Assistant Examiner* — Adam G Barlow
(74) *Attorney, Agent, or Firm* — Crump Law P.C.

(57) ABSTRACT

The corner caps have retention flanges and tabs which prevent the caps from being pulled or rooted from the corner posts. The corner cap includes two adjacent upright rear walls that terminate in angled retaining flanges and an L-shaped bottom wall that terminate in angled retaining tabs. The edge of the retaining tabs and retaining flanges press against the walls of the corner posts when the corner cap is inserted into the corner post. The mechanical resilience in the bends that form the retaining tabs and flanges allow the engagement between the corner cap and corner post to securely hold the cap within the post and prevent it from being pulled or rooted out of the corner post by small animals.

8 Claims, 7 Drawing Sheets

SIDING OUTER CORNER POST CAP

This invention relates to caps for siding outer corner posts, and in particular a cap inserted into the bottom of outer corner posts to prevent the ingress of insects and small animals.

BACKGROUND AND SUMMARY OF THE INVENTION

The exterior of many buildings are covered with modular siding. Typically, individual siding panels fit and nest into corner channel affixed to the building corners. While, the corner channels are configured to receive the horizontal siding panels, that configuration also creates openings at the bottom the channel when affixed to the wall substructure, which allows the ingress of insects and small animals. To prevent the intrusion of insect and small animal, the bottom openings of the corner posts are often stuffed with steel wool. Alternatively, metal and plastic corner caps have been developed to insert into the bottom openings of corner posts to prevent the ingress of insects and small animals. However, these corner caps, as well as the steel wool, are easily pulled and rooted from the corner posts by small animals.

The corner caps of this invention have retention flanges and tabs which prevent the caps from being pulled or rooted from the corner posts. The corner caps of this invention are configured to accommodate the shape and configuration of conventional corner posts and seat within the bottom opening when the corner post is affixed to the building. The corner cap includes two adjacent upright rear walls that terminate in angled retaining flanges and an L-shaped bottom wall that terminates in angled retaining tabs. The edge of retaining tabs and retaining flanges press against the walls of the corner posts when the corner cap is inserted into the corner post. The mechanical resilience in the bends that form the retaining tabs and flanges allow the engagement between the corner cap and corner post to securely hold the cap within the post and prevent it from being pulled or rooted out of the corner post by small animals.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
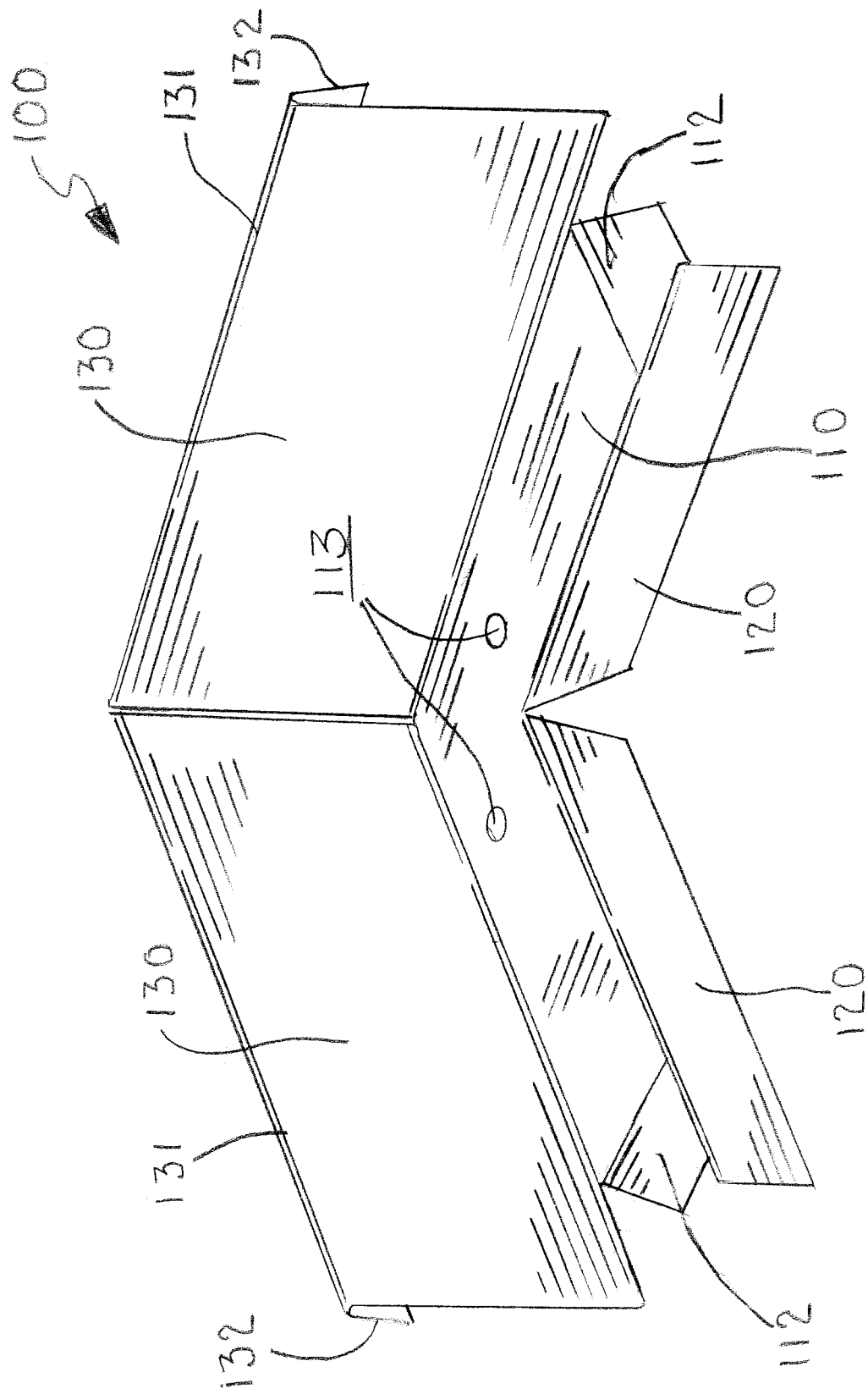
FIG. 1 is a perspective view of an exemplary embodiment of the corner post cap of this invention.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-4 illustrate an embodiment of the corner channel cap of this invention, designated as reference numeral 100. Corner cap 100 is designed and intended for use with conventional exterior siding outer corner posts. Siding outer corner posts are fastened to the sheathing and framing to enclose the sheathing edges at the outer corners of the building and the ends of the horizontal sliding planks. Due to their configuration, outer corner posts have exposed bottom openings when affixed to building corners, which provide potential ingress for insect and animals into the wall structure. Corner cap 100 is inserted into the exposed opening in the bottom of the corner post to fill and enclose those exposed bottom openings of the corner posts.

Corner cap 100 is illustrated with a conventional siding corner post 10, such as the ones available from Georgia-Pacific. Like other conventional siding components, outer corner post 10 is a single elongated component, generally formed or extruded from narrow sheets of vinyl or aluminum. As shown best shown in FIG. 2, corner post 10 is symmetrical about a longitudinal axis through a center fold 21. Two adjacent side sections 20 extend generally at a right angle from center fold 21. Each side section 20 is bent or formed to have exposed exterior wall 22 and terminates in a nail hem (mounting flange) 24. An intermediate channel 23 is formed between outer wall 22 and mounting flange 24 for receiving the stacked horizontal siding planks (not shown). Channels 21 are formed between exterior wall 22 and nail hem 24 defined in part by the mounting flange, a channel back wall 26 and a short channel front wall 28. Channel front walls 28 are formed by a return bend 27 and underlies a portion of outer face 22. Return bends 27 forms a gap 29 between exterior wall 22 and channel front wall 28. When affixed to a building corner, corner post 10 has a bottom opening 11 between the adjacent exterior wall 22 and the adjacent sheathing 2 of the building corner.

As shown, corner cap 100 is configured to accommodate the shape and configuration of corner post 10 and seat within bottom opening 11 when corner post is affixed to the building. Typically, corner cap 100 begins as a flat blank of tin, steel, aluminum or other suitable metal. Metal is a desirable material for the corner cap because it is resistant to animals and insect damage. The flat blank has a particular outline and configuration that allows it to be bent and formed to accommodate corner post 10. To facilitated the bends that form the finished corner cap, the blanks have a number of fold lines and cut-outs (not shown) formed in the flat blanks. As shown, corner cap 100 includes an L-shaped bottom wall 110, two upright rear walls 120 and two upright front walls 130. Cap rear walls 120 and cap front walls 130 lie generally in parallel planes perpendicular to bottom 110. Each of the opposed ends of bottom wall 110 terminate in angled retaining tabs 112. The distal ends of cap rear walls 120 and cap front walls 130 extend past bottom tabs 112. The edges of cap front walls 130 are bent over along a fold 131 to form angled retaining flanges 132. Cap bottom wall 110 also has a pair of weep holes 113, which allow air and condensation to pass through corner cap 100.

Figure 2:
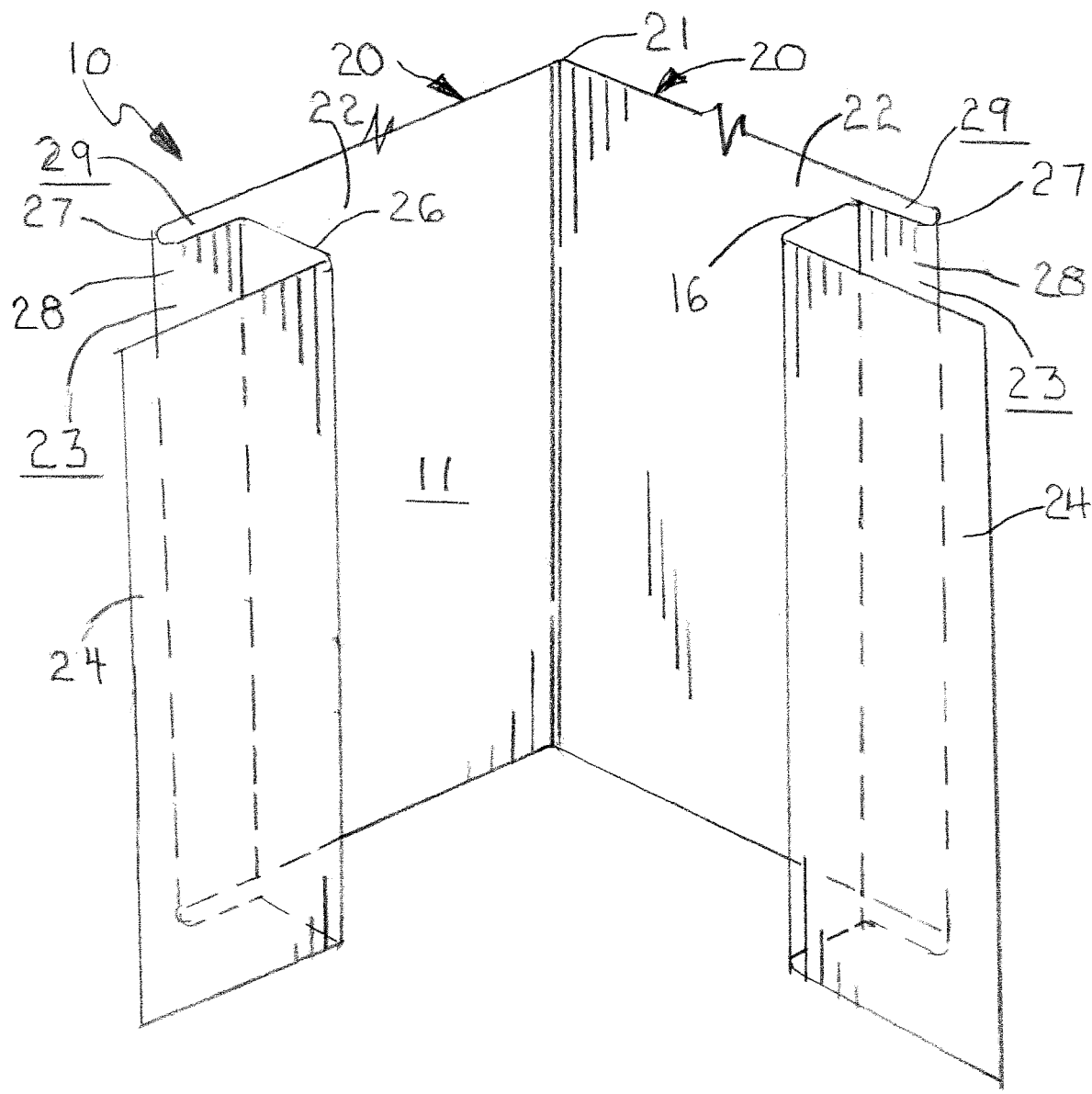
FIG. 2 is a perspective view of an exemplary siding outer corner post.
Figure 3:
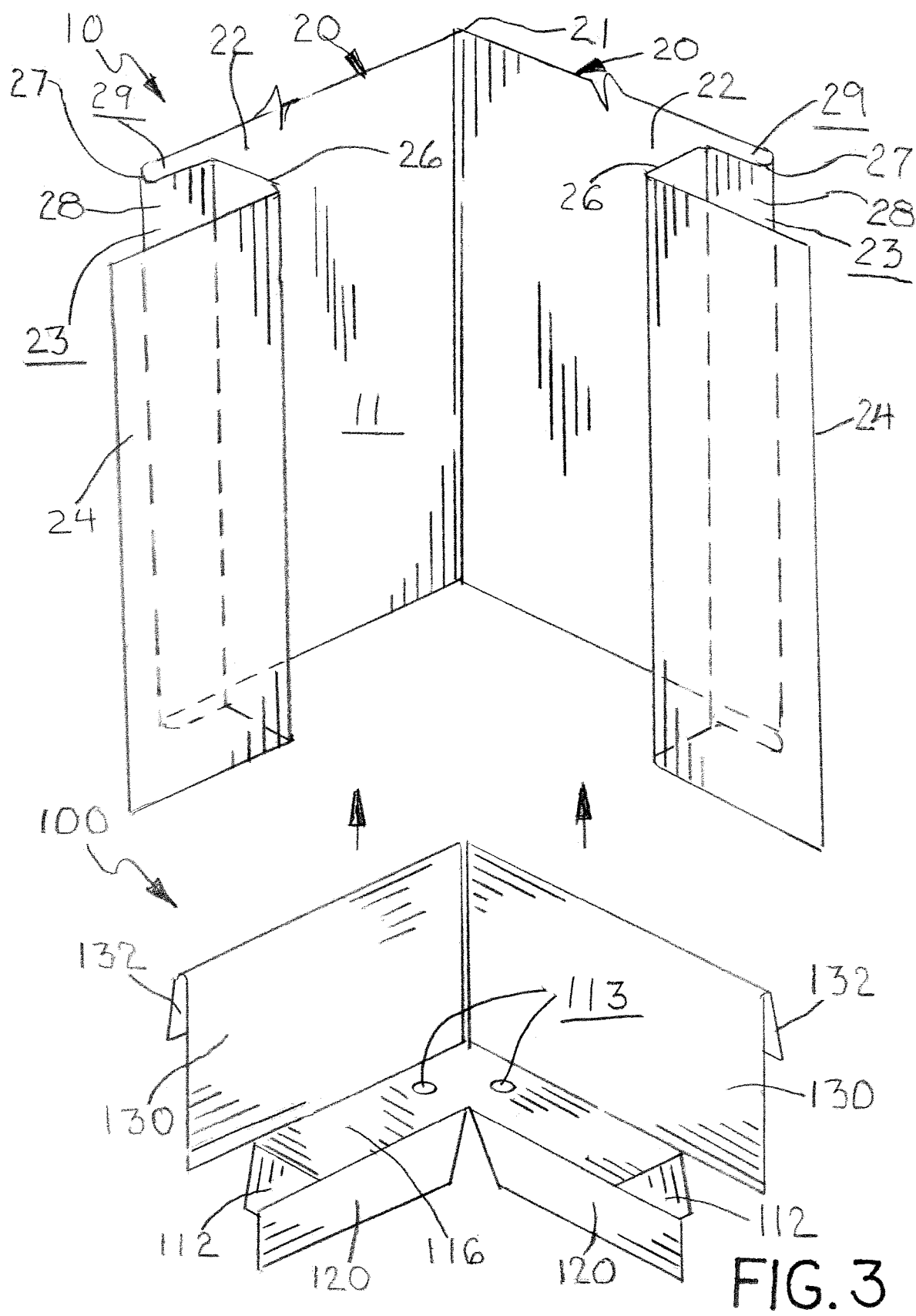
FIG. 3 is an exploded view of a portion of an exemplary corner post of FIG. 2 and the corner post cap of FIG. 1 positioned to be inserted in the bottom of the corner post.
Figure 4:
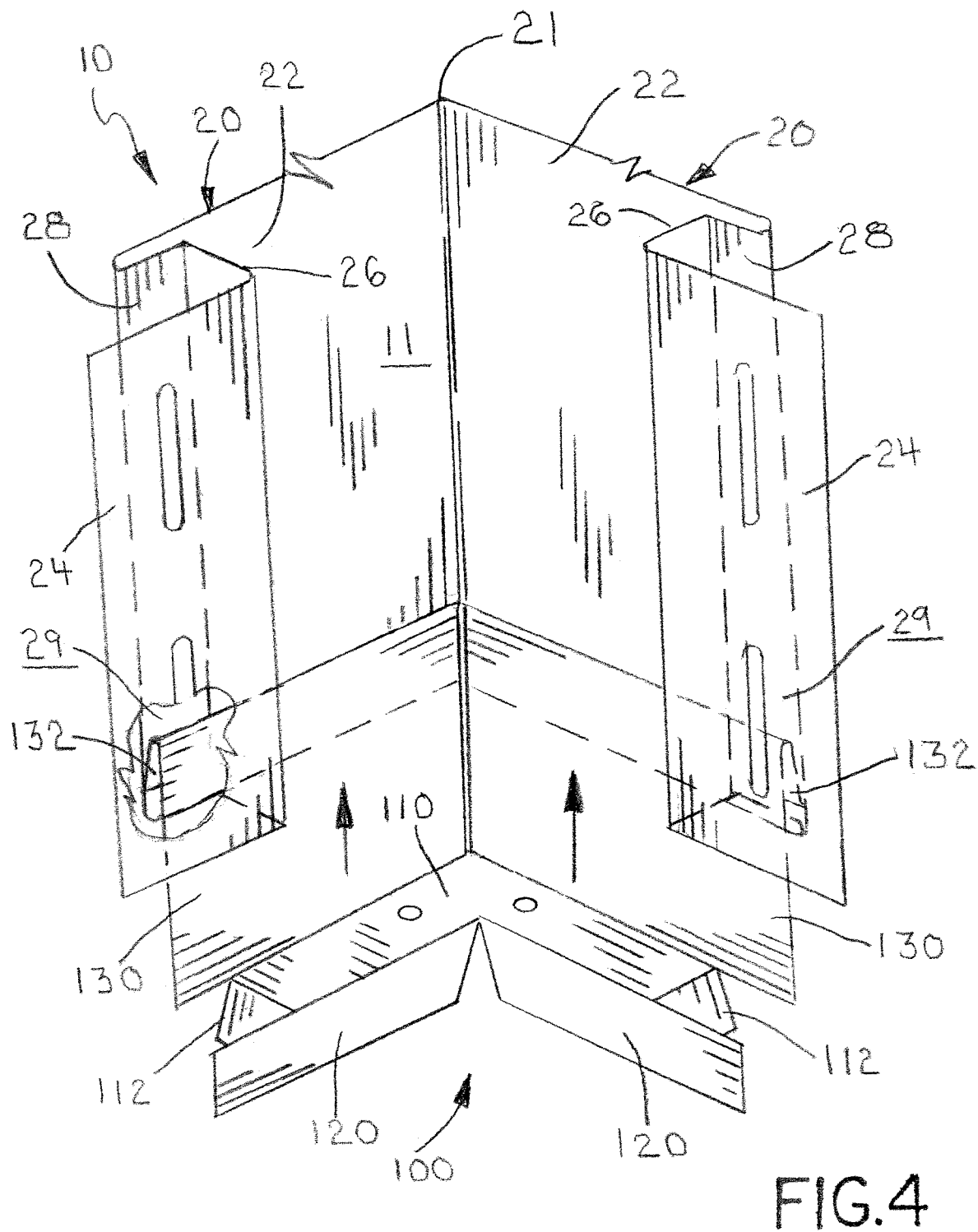
FIG. 4 is an exploded view of a portion of an exemplary corner post of FIG. 2 and the corner post cap of FIG. 1 being inserted in the bottom of the corner post.
Figure 5:
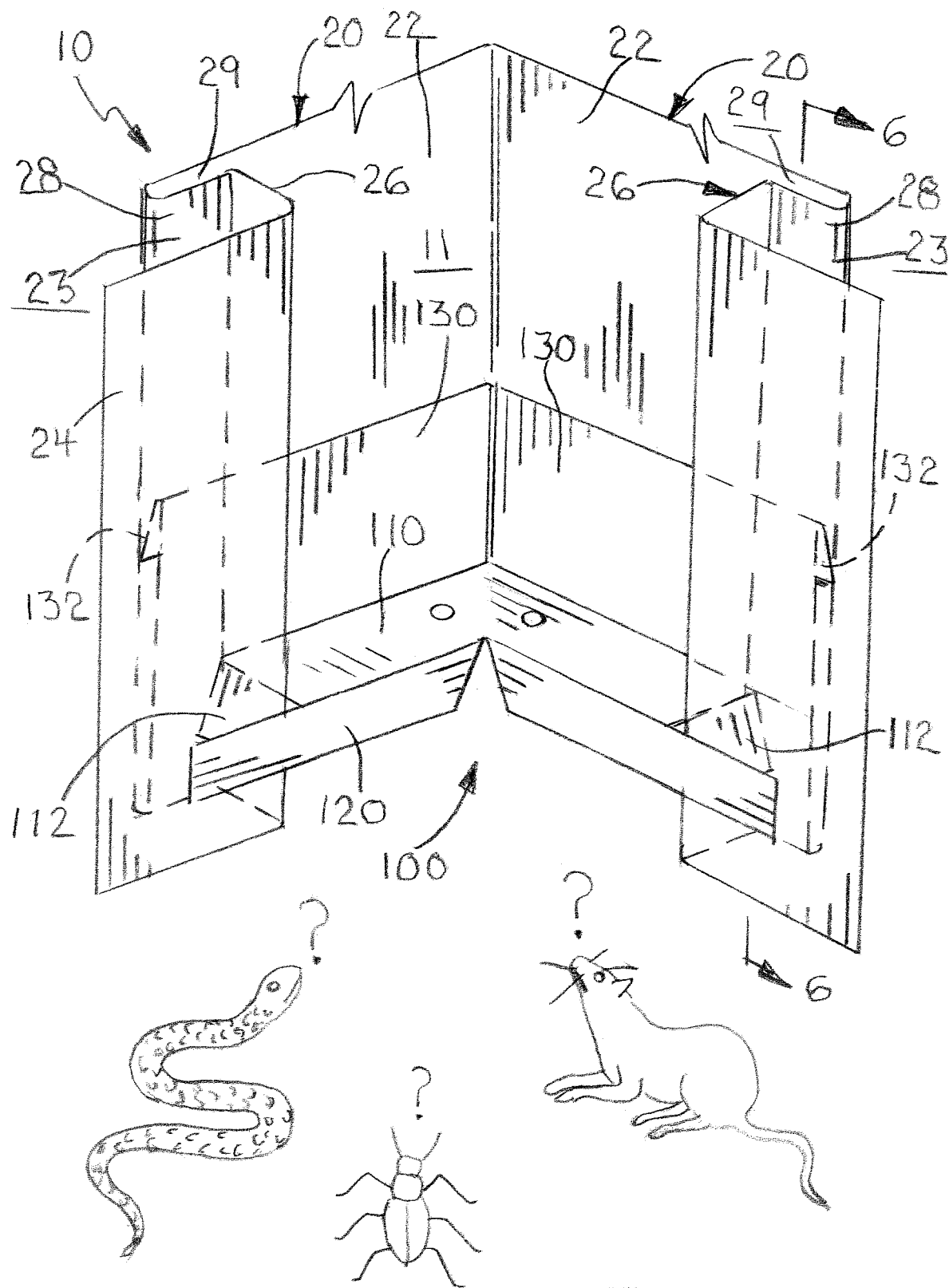
FIG. 5 is an exploded view of a portion of an exemplary corner post of FIG. 2 and the corner post cap of FIG. 1 seated within the corner post.
Figure 6:
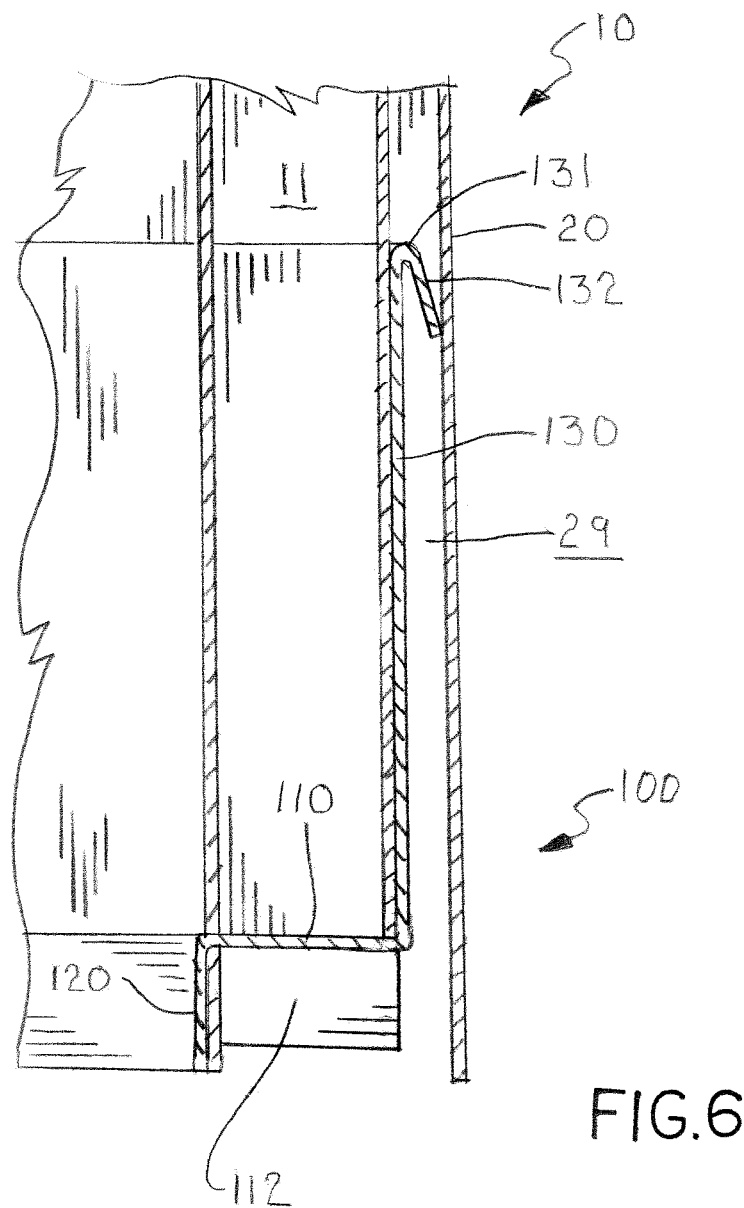
FIG. 6 is a cross-sectional end view of the corner post and corner post cap of FIG. 4.
Figure 7:
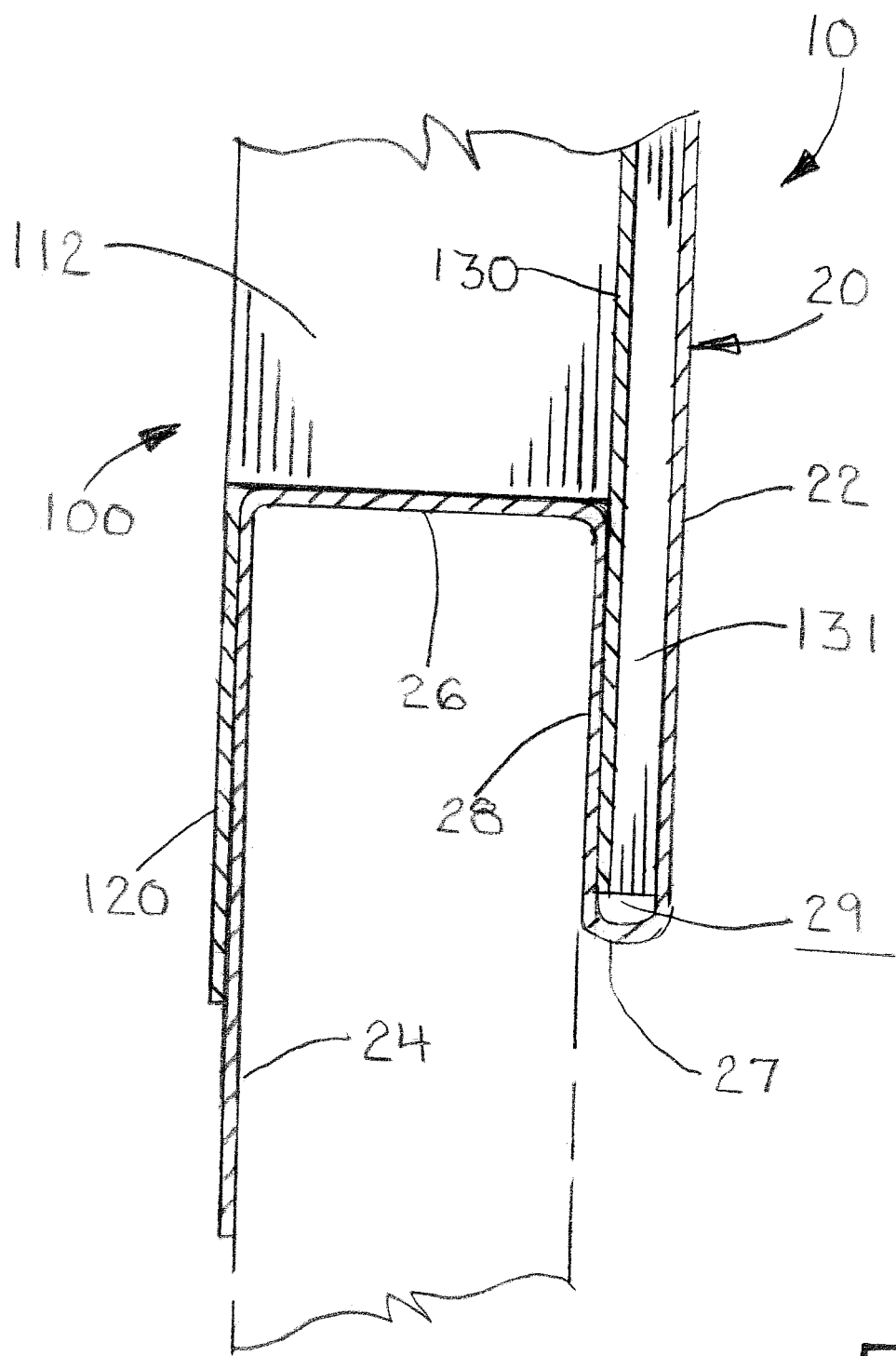
FIG. 7 is a partial top sectional view of the corner post and the corner post cap of FIG. 4.

FIGS. 2-4 illustrate how the configuration of corner cap 100 is fitted into the bottom of corner post 10. Corner cap 100 is manually inserted into bottom opening 11 (FIG. 1). As corner cap 100 is inserted into corner post 10, the ends of cap front walls 130 and angled flanges 132 are slid into gaps 29 and underlie exterior walls 22 of corner cap 10 (FIG. 3). Similarly, the ends of cap rear wall 120 underlies nail hem 24 (FIG. 4) with the cap rear wall interposed between the sheathing (not shown) and the nail hem. The parallel orientation of cap rear wall 120 and cap front wall 130 ensure that corner cap 100 is squarely inserted into opening 11 of corner post 10. As shown, the edge of retaining tabs 112 press against channel back wall 26 of corner cap 10 and retaining flanges 132 press against exterior walls 22 of corner cap 10. Once inserted into corner post 10, corner cap 100 fully encloses opening 11 and gaps 29 preventing ingress of insects and small animals into the siding and wall substructure interior. Moreover, the mechanical resilience in the bends that form retaining tab 112 and retaining flanges 132 allow the engagement with channel back wall 26 and exterior 22 to securely hold corner cap 100 within corner post 10 and prevent it from falling or being pulled or rooted out of the corner post by small animals.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A corner cap for an exterior corner post, where the corner post includes a post body having symmetrical adjacent side sections defining a bottom opening therebetween, each side section has an exterior wall that terminates in a nail hem, each side section also has an intermediate channel formed between the exterior wall and the nail hem defined a channel back wall, a short outer wall and the nail hem, a channel front wall is formed by a return bend and underlies a portion of the outer face forming a gap between the exterior wall and the channel front wall, the corner cap comprises:
a corner cap body configured to conform to the bottom opening of the corner post for enclosing the bottom opening of the corner post, the corner cap body includes an L-shaped cap bottom wall, two adjacent upright cap rear walls, and two upright cap front walls, each of the two cap front walls are configured to underlie one of the exterior walls of the post body and each of the two cap rear walls are configured to underlie one of the nail hems of the post body when the corner cap is inserted into the bottom opening of the post body, each of the two cap front walls terminate in an angled retaining flange adapted to press against one of the exterior walls when the corner cap is inserted into the bottom opening of the post body.

2. The corner cap of claim 1 wherein the opposed ends of the bottom wall terminate in an angle retaining tab, the retaining tab is adapted to press against one of the channel back walls when the corner cap is inserted into the bottom opening of the post body.

3. The corner cap of claim 1 wherein each of the two cap front walls extend into one of the gaps of the corner post when the corner cap is inserted into the bottom opening of the post body.

4. The corner cap of claim 2 wherein each retaining tab of the cap bottom wall is formed by a bend in the cap bottom wall.

5. The corner cap of claim 1 wherein the retaining flange of each of the two cap front walls is formed by a bend in each of the two cap front walls.

6. The corner cap of claim 2 wherein each of the retaining tabs are interposed between one of the cap front wall and the cap rear walls.

7. The corner cap of claim 1 wherein each of the cap front walls are substantially parallel to one of the cap rear walls.

8. A corner cap for an exterior corner post, where the corner post includes a post body having symmetrical adjacent side sections defining a bottom opening therebetween, each side section has an exterior wall that terminates in a nail hem, each side section also has an intermediate channel formed between the exterior wall and the nail hem defined a channel back wall, a short outer wall and the nail hem, a channel front wall is formed by a return bend and underlies a portion of outer face forming a gap between the exterior wall and the channel front wall, the corner cap comprises:
a corner cap body configured to conform to the bottom opening of the corner post for enclosing the bottom opening of the corner post, the corner cap body includes an L-shaped cap bottom wall, two adjacent upright cap rear walls, and two upright cap front walls, each of the cap front walls are substantially parallel to one of the cap rear walls, each of the two cap front walls are configured to extend into one of the gaps of the corner post when the corner cap is inserted into the bottom opening of the post body, each of the two cap front walls are also configured to underlie one of the exterior walls of the post body and each of the two cap rear walls configured to underlie one of the nail hems of the post body when the corner cap is inserted into the bottom opening of the post body, each of the two cap front walls terminate in an angled retaining flange adapted to press against one of the exterior walls when the cap corner cap is inserted into the bottom opening of the post body, opposed ends of the bottom wall terminate in an angled retaining tab interposed between the one of the cap front wall and one of the cap rear walls, the retaining tab is adapted to press against one of the channel back walls when the cap corner cap is inserted into the bottom opening of the post body.

* * * * *